United States Patent [19]
Young

[11] 3,853,747
[45] Dec. 10, 1974

[54] HYDROCRACKING PROCESS

[75] Inventor: Dean Arthur Young, Yorba Linda, Calif.

[73] Assignee: Union Oil Company of California, Los Angeles, Calif.

[22] Filed: Feb. 20, 1973

[21] Appl. No.: 334,162

Related U.S. Application Data

[60] Division of Ser. No. 209,440, Dec. 17, 1971, abandoned, which is a continuation-in-part of Ser. No. 869,389, Oct. 24, 1969, abandoned, which is a continuation-in-part of Ser. No. 669,288, Sept. 20, 1967, abandoned.

[52] U.S. Cl. .............................. 208/111, 252/455 Z
[51] Int. Cl. ............................................. C10g 13/02
[58] Field of Search ................. 208/111; 252/455 Z

[56] References Cited
UNITED STATES PATENTS

| | | | |
|---|---|---|---|
| 2,884,371 | 4/1959 | Kirshenbaum et al. | 208/111 |
| 3,193,491 | 7/1965 | Cramer et al. | 208/111 |
| 3,210,265 | 10/1965 | Garwood | 208/111 |
| 3,236,761 | 2/1966 | Rabo et al. | 208/111 |
| 3,425,957 | 2/1969 | Pessimisis | 252/455 Z |
| 3,617,509 | 11/1971 | Hensley | 208/111 |
| 3,649,523 | 3/1972 | Bertolacini | 208/111 |
| 3,694,345 | 9/1972 | Bittner | 208/111 |
| 3,699,181 | 10/1972 | Kmecak et al. | 252/455 Z |
| 3,706,693 | 12/1972 | Mickelson et al. | 252/455 Z |

*Primary Examiner*—Delbert E. Gantz
*Assistant Examiner*—James W. Hellwege
*Attorney, Agent, or Firm*—Richard C. Hartman; Lannas S. Henderson

[57] ABSTRACT

Hydrocracking catalysts of improved activity comprising a Group VIB metal hydrogenation component and a crystalline aluminosilicate zeolite base are prepared by adding the Group VIB metal component to the zeolite in an aqueous acidic medium which maintains the Group VIB metal component in an essentially undissolved form. Catalysts prepared in this manner are found to display higher hydrocracking activity than conventional compositions wherein the Group VIB metal component is added to the zeolite by impregnation from an aqueous solution thereof.

18 Claims, No Drawings

3,853,747

HYDROCRACKING PROCESS

RELATED APPLICATIONS

This is a division, of application Ser. No. 209,440, filed Dec. 17, 1971 now abandoned, which is a continuation-in-part of my copending application Ser. No. 869,389, filed Oct. 24, 1969, now abandoned which in turn is a continuation-in-part of copending application Ser. No. 669,288 filed Sept. 20, 1967, now abandoned.

BACKGROUND AND SUMMARY OF INVENTION

This invention relates to improved hydrocracking catalysts and their preparation and to hydrocracking processes employing the catalysts. Metals of Group VIB, in elemental form or in the form of their oxides or sulfides, have previously been employed as hydrogenation components on bases such as alumina and silicaalumina for hydrocracking operations. More recently, crystalline zeolites have been employed as the base material for catalysts in such reactions. While these catalysts have proved fairly satisfactory, improved performance, particularly with respect to ability to give a high yield of useful product, is much to be desired.

Prior art zeolite catalysts, such as those disclosed in U.S. Pat. No. 3,013,988, comprise a crystalline aluminosilicate zeolite containing a Group VIB metal, or oxide thereof, dispersed in the internal adsorption area of the zeolite. Such a dispersion was believed essential in order to provide the catalytic material in a form having a high specific surface suitable for catalysis. Dispersion of the catalytic material in the inner adsorption area of the zeolite was achieved by various processes such as (1) impregnation with an aqueous solution of a metal salt, followed by drying and thermal decomposition of the metal compound, (2) cation exchange using an aqueous solution of metal salt wherein the metal forms the cation, (3) cation exchange using an aqueous solution of a metal compound in which the metal is in the form of a complex cation with complexing agents such as ammonia, followed by thermal decomposition of the complex, and (4) vapor deposition of the metal or compound of the metal in the zeolite.

It has now been found that not only is dispersion in the inner adsorption area of the zeolite not essential, but that hydrocracking activity of the catalyst is greater when the hydrogenating component is incorporated in the zeolite in such a manner as to avoid impregnation into the inner adsorption area of the zeolite crystallites or particles. Although the reason for the greater activity of the catalysts of the present invention is not known with certainty, it is believed that the effect may be due to greater concentration of the hydrogenation component on the exterior surface of the zeolite and, hence, its greater availability for catalyzing the hydrocracking reaction. Also, it appears in some cases that soluble molybdenum or tungsten compounds added to the zeolite by impregnation tend to destroy the zeolite crystal structure and acidity during the subsequent drying and calcination steps.

DETAILED DESCRIPTION

According to the invention, the desired dispersion of the Group VIB metal hydrogenation component is achieved by adding it to the zeolite in a finely divided but essentially undissolved form. As disclosed in my copending parent applications cited above, this may be achieved in several ways, chiefly the following:

1. A relatively insoluble compound of the Group VIB metal may be mixed with the zeolite in the presence of water. Examples of suitable compounds are molybic oxide, tungsten oxide, tungstic acid, ammonium ceric dodecamolybdate, etc. The mixing may consist of stirring, mulling, grinding, or any conventional procedure for obtaining an intimate mixture of solid materials. Mulling or grinding may be carried out in any conventional apparatus such as a pan muller, ball mill, pug mill or cone mixer for a period of time sufficient to intimately mix the Group VIB metal compound and the zeolite and to reduce the particle size of the two if desired. Mulling or grinding for a period of about 10 to 30 minutes with resultant reduction of average particle size to about 0.5 – 5 microns is normally sufficient.

The optimum amount of water may vary widely, depending on the type of mixing, the type and particle size of the Group VIB metal compound and the zeolite, etc. Although several of these compositions, i.e., molybdic acid and tungstic acid, are fairly soluble in water, particularly at elevated pH levels, only minor amounts, i.e., less than 10 percent, are solubilized and deposited inside the aluminosilicate unless large amounts of water are employed, and mulling or mixing in the presence of excess water is continued for an extended period. Nevertheless, several precautions can be taken to avoid deposition of the active metals within the zeolite. One of these is the maintenance of a relatively low pH, preferably within the range of 3 to about 5, during the mixing in the presence of water so as to assure the insolubility of the otherwise slightly soluble additives.

Following the mixing, the water content of the mixture is suitably adjusted to provide an extrudable paste, preferably in combination with a binder such as silica or alumina. The mixture is then extruded or pelleted, dried and calcined, according to conventional procedures.

2. A soluble Group VIB metal compound may be mulled or ground with the zeolite, provided the mixture is dry or contains insufficient water to dissolve an appreciable amount of the soluble compound. Examples of suitable soluble compounds are ammonium heptamolybdate, ammonium dimolybdate, ammonium paratungstate, ammonium sulfotungstate, etc. However, as in the previous case involving addition of insoluble compounds, care should be taken to assure the formation of a finely dispersed form of the calcined active metal component. All of the soluble compounds considered in this embodiment are thermally decomposable and become more dispersed upon calcination due to fragmentation and conversion to a different chemical form. Nevertheless, care should be taken to assure a relatively even fine particle size distribution of the starting materials, i.e., the ammonium heptamolybdate, paratungstates, etc., during the mulling or mixing step. This objective can be easily accomplished by employing finely divided starting materials usually having particle sizes below about 300 microns, preferably less than about 200 microns. The particle size of these materials is further reduced upon mulling and, as previously mentioned, finer dispersion results from calcination and thermal decomposition. Promoters or stabilizers such as nickel nitrate crystals or cobalt carbonate may be added to the mixture prior to mulling or grinding. Following the mulling step the mixture is treated with a binder, other catalyst ingredients, pelleted, dried and calcined as above.

3. Insoluble or undissolved Group VIB metal compounds can be formed in the presence of the zeolite. For example, the zeolite can be slurried in a solution of ammonium molybdate or tungstate. Then the slurry is acidified to precipitate molybdic or tungstic acid. Insoluble heteropoly compounds can also be formed in a slurry of the zeolite, e.g., by adding phosphomolybdic acid to an ammonium zeolite precipitates ammonium phosphomolybdate. Suitable insoluble combinations can also be prepared by slurrying the zeolite in an ammonium tungstate or molybdate solution and then adding a precipitating solution which contains, e.g., a dissolved Group IV metal (Titanium, zirconium or hafnium) compound. Solutions of the Group VIB component and the precipitating agent may also be added concurrently to a zeolite slurry with the initial acidities and proportions adjusted to obtain a pH sufficient to promote precipitation without destroying the zeolite. In addition, the Group IV metal compound, preferably in the form of a hydrous oxide, may be added to the zeolite prior to the addition of the Group VIB component. In any event, the hydrous oxides, e.g., the oxides of titanium, zirconium, thorium, iron, chromium or cerium, should have high isoelectric points and are preferably catalytically active along or in combination with the zeolite or other active constituents. It is also presently preferred that the pH of the media in which the Group VIB metal component is added to the hydrous oxide-aluminosilicate system be below the isoelectric point of the hydrous oxide, preferably within the pH range of about 3 to about 5.

The exact mechanism or mechanisms involved in utilizing such a Group IV metal compound for adding the Group VIB hydrogenation component is not known. However, it is believed that the operative mechanisms may involve either formation of an insoluble compound with the hydrogenating component or adsorption of the hydrogenating component as, for example, by means of ion exchange with a hydrous oxide of the Group IV metal. In any event, utilization of the Group IV metal results in efficient removal of the Group VIB hydrogenation component from solution and its incorporation with the zeolite structure in such manner as to provide the described advantages.

These methods result in the nearly quantitative addition of the Group VIB component to the zeolite since there is no-appreciable loss due to unadsorbed materials. Consequently, the recovery of impregnating solutions is not necessitated. These methods also permit post-exchange of stabilizing cations, such as cobalt or nickel, into the zeolite.

The mulling or grinding procedures, (1) and (2), can be followed by the addition of an alumina sol or basic aluminum salts along with sufficient water to form an extrudable paste. Mixtures which contain about 20 percent alumina on a dry weight basis usually require about 50 to 60 percent water to form an extrudable mixture. An excellent binder can be prepared by adding nitric acid to a 30 percent slurry of boehmite. Adequate peptization occurs with 0.1 to 1.0 acid equivalents per mole of alumina. Acid-sensitive zeolites can be protected by adding a suitable buffer such as nickel carbonate. However, the sol-zeolite mixture should be kept slightly acidic with pH less than 4.6 to avoid gelling the sol. A low pH is also necessary to maintain insoluble molybdic or tungstic acid. Insoluble heteropoly compounds and titanium or zirconium molybdates also decompose and dissolve in neutral mixtures. Solubilization lowers the activity and causes the catalyst to be similar to conventional impregnated preparations.

From the foregoing it will be apparent that in any of the foregoing methods which involve the presence of a substantial aqueous phase, it is beneficial to maintain acid conditions during the mulling and drying of the Group VIB-zeolite mixture. It is contemplated to maintain any pH above the level at which destruction of the zeolite crystal structure occurs, up to about 6. The various zeolites differ considerably in their susceptibility to acid attack, but normally pH's within the range of about 2–6, preferably 3–5 will be utilized. Although any compatible acid may be used, it is preferred to employ acids having a monovalent anion, and especially acids having thermally decomposable anions such as nitric or acetic.

The crystalline zeolites employed herein, commonly known as molecular sieves, are aluminosilicates such as those of the Y, (including ultrastable Y) X, A, L, T, $\Omega$, and B crystal types, as well as zeolites found in nature such as for example mordenite, stilbite, heulandite, ferrite, chabazite, and the like. The preferred crystalline zoelites are those having crystal pore diameters between about 6 – 15 A, wherein the $SiO_2/Al_2O_3$ mole ratio is about 3/1 to 10/1. For most catalytic purposes, e.g., catalytic hydrocracking, it is preferable to replace most or all of the zeolitic alkali metal cations normally associated with such zeolites with other cations, particularly hydrogen ions and/or polyvalent metal ions such as cobalt, nickel, magnesium, zinc, rare earth metals, and the like. A particularly desirable form of zeolite is a stabilized hydrogen Y zeolite prepared by first exchanging a major proportion of the zeolitic sodium ions with ammonium ions, then calcining the partially exchanged material in the presence of steam at temperatures of about 700° to 1,200°F., then reexchanging the once-calcined material with ammonium salt to reduce the sodium content to below about 0.5 weight-percent. The resulting ammonium zeolite is then mixed with a hydrous alumina binder and the desired hydrogenating metals, pelleted or extruded, and again calcined. The unit cell constant of the Y zeolite stabilized in this manner is between about 24.45 and 24.6 A.

Another particularly desirable type of zeolite for use herein is described in my copending application Ser. No. 761,321. It is prepared by exchanging into a suitable zeolite, particularly Y zeolite, a stabilizing proportion of a Group VIII metal, particularly nickel or cobalt, and then calcining the resulting metal zeolite prior to addition of the Group VIB metal component. Calcining the aluminosilicate intermediate the addition of the Group VIII and the Group VIB components so modifies the characteristics of the combination that the resultant composition exhibits activity superior to that exhibited by catalysts prepared without intervening calcination.

The Group VIB metals employed herein comprise chromium, molybdenum, and tungsten or any combination thereof, preferably molybdenum, and/or tungsten, in the form of their oxides or sulfides. Amounts of the Group VIB hydrogenation component will usually range from about 1 percent to 20 percent by weight of the final composition, based on free metal. Generally, optimum proportions will range between about 5 percent and 15 percent. Molybdenum in the form of the sulfide is especially preferred as the hydrogenation component, preferably in combination with nickel- or cobalt-stabilized zeolites.

Although as noted above, it is preferred to add the stabilizing component, e.g., nickel or cobalt, to the zeolite, and calcine the resulting composition prior to addition of the Group VIB component, it is also contemplated that the stabilizing metal may be added after or simultaneously with addition of the Group VIB component. Proportions of the nickel or cobalt will range from about 2 percent to 15 percent by weight, with the preferred range being from about 4 to 8 percent. The partial solubility of the Group VIB component precursor in some embodiments also renders it advisable to incorporate the stabilizing cation before adding the particulate molybdenum or tungsten compound with intermediate drying and/or calcination. This procedure limits loss and solubilizing of the Group VIB component.

Following incorporation of the metal constituents into the zeolite the composite is pelleted or otherwise treated to obtain catalyst particles of the size and shape desired for the reaction to be catalyzed. For hydrocracking processes, pellets of the type described in the examples below are generally suitable. A binder or matrix material is desirably incorporated in, or admixed with, the metal-zeolite composite prior to pelleting in order to increase the resistance of the final catalyst particles to crushing and abrasion. Silica, introduced in the form of a sol, is very satisfactory for this purpose; however, other oxides such as alumina or mixed oxides such as silica-alumina, silica-zirconia, etc. may also be used. A particularly preferred material is Ludox silica sol, described in U.S. Pats. Nos. 2,574,902 and 2,597,872. Another preferred material is alumina hydrogel.

The catalyst pellets are then dried and activated by calcining in an atmosphere that does not adversely affect the catalyst, such as air, nitrogen, hydrogen, helium, etc. Generally, the dried material is heated in a stream of dry air at a temperature of from about 500°F. to 1,500°F., preferably about 900°F., for a period of about 0.5 to 16 hours, preferably about 2 hours, thereby converting the metal constituents to oxides.

In addition, the catalysts are preferably further activated by presulfiding with a sulfide such as hydrogen sulfide to convert the metal constituents of the catalyst to sulfides. This is readily accomplished, e.g., by saturating the catalyst pellets with hydrogen sulfide for a period of from 1 to 4 hours. This procedure is described in more detail in U.S. Pat. No. 3,239,451.

The hydrocracking feedstocks which may be treated using the catalysts of the invention include in general any mineral oil fraction boiling above the conventional gasoline range, i.e., above about 300°F. and usually above about 400°F., and having an end-boiling-point of up to about 1,000°F. This includes straightrun gas oils and heavy naphthas, coker distillate gas oils and heavy naphthas, deasphalted crude oils, cycle oils derived from catalytic or thermal cracking operations, etc. These fractions may be derived from petroleum crude oils, shale oils, tar and oils, coal hydrogenation products, etc. Feedstocks boiling above about 480°F., preferably between about 400° and 650°F., having an API gravity of 20° to 35°, and containing at least about 30 percent by volume of acid-soluble components (aromatics + olefins) are generally employed. All of these feeds are known to contain substantial amounts of aromatic compounds which are hydrogenated and hydrocracked only with considerable difficulty. As demonstrated by the examples hereinafter detailed the catalysts of this invention are much more effective in hydrogenating and hydrocracking heavier aromatic compounds such as naphthalenes, indanes, tetralins and the like. These catalysts are therefore particularly effective for converting feeds containing 10 volume percent, generally in excess of 30 volume percent of aromatics to gasoline and midbarrel fuels.

Conversion conditions effective for promoting hydrogenation or hydrocracking generally comprise temperatures of about 500 to about 900°F., hydrogen partial pressures of about 400 – 3,000 psig, hydrogen ratios of about 1,000 to 15,000 scf/b, and liquid hourly space velocities ranging between about 0.5 and 5.

While the foregoing description has centered mainly on hydrocracking processes, the catalysts described are also useful in a great variety of other chemical conversions, and generally, in any catalytic process requiring a hydrogenating or acid function in the catalyst. Examples of other reactions contemplated are hydrogenation, alkylation (of isoparaffins with olefins, or of aromatics with olefins, alcohols or alkyl halides), isomerization, polymerization, reforming (hydroforming), desulfurization, denitrogenation, carbonylation, hydrodealkylation, hydration of olefins, transalkylation, etc.

The following examples will serve to more particularly illustrate the preparation of the catalysts of the invention and their advantageous properties in hydrocracking operations.

Examples 1–4 and Table 1 show a comparison of four catalysts with similar compositions and zeolitic stabilities. The conventional preparation of Example 1, prepared by impregnation, had the lowest hydrogenation and hydrocracking activity. The three catalysts of Examples 2, 3 and 4, prepared by combining insoluble forms of molybdenum with cobalt zeolite Y, all gave similar higher hydrocracking and hydrogenation conversions, as shown in Table 1.

All four catalysts were made from the same batch of cobalt zeolite Y. The cobalt zeolite was prepared by slurrying 560 g ammonium zeolite Y in 500 ml water, adding 500 ml 1.5M $CoCl_2$, and heating to boiling for 1 hour. Then the slurry was filtered, washed and the exchange repeated. After the second exchange the zeolite was washed free of chloride and dried overnight at 220°F. Four 120 g portions of the cobalt zeolite were treated according to Examples 1–4.

EXAMPLE 1

The zeolite powder was mixed with 126 ml Ludox LS 30 percent silica sol. Then 36 ml 1.7M $Co(NO_3)_2$ was added as a coagulant. The paste was cast into 0.094 × 0.020-inch pellets, dried at 220°F. and calcined 2 hours at 600°F. The calcined pellets were immersed for one hour in 155 ml of 1.04M $(NH_4)_2MoO_4$. Then the pellets were drained, dried at 220°F. and recalcined 2 hours at 600°F. Next the pellets were spread in a thin layer and the remaining drained molybdate solution was poured evenly over the pellets. The remainder of the solution was completely adsorbed. Then the pellets were redried and finally calcined at 900°F.

EXAMPLE 2

The cobalt zeolite Y powder, 120 g, was dry mixed with 23.3 g molybdic oxide for 30 minutes to a 12-inch pan muller. Then the mixture was added to 126 ml Ludox LS and 36 ml 1.7M Co(NO$_3$)$_2$ and formed into pellets as in Example 1. The pellets were dried and then calcined at 900°F.

EXAMPLE 3

The cobalt zeolite Y powder, 120 g, was mixed with 80 ml water and 23.3 g molybdic oxide powder. The mixture was stirred for 20 minutes and then dried overnight at 220°F. The dried cake was granulated through a 60 mesh screen before mixing with 126 ml Ludox LS and 36 ml 1.7M Co(NO$_3$)$_2$. The resulting paste was formed into pellets, dried, and calcined as in Examples 1 and 2.

EXAMPLE 4

Ammonium phosphomolybdate was prepared as follows: A molybdate solution was prepared by dissolving 85.2 g (NH$_4$)$_6$Mo$_7$O$_{24}$·4H$_2$O in 390 ml water. Then 85 ml 15N HNO$_3$ was added. A phosphate solution was prepared by dissolving 21.2 g (NH$_4$)$_2$HPO$_4$ in 85 ml water and 42 ml 15N HNO$_3$. The phosphate solution was slowly added to the molybdate solution. Then the mixture was allowed to stand 20 minutes, chilled and decanted. The pH was adjusted to 2.0 with 3N NH$_4$OH. Then the slurry was filtered, washed with ice water, and pressed out to a firm cake. The ammonium phosphomolybdate contained 31.3 percent volatile material when a sample was calcined at 1,000°F.

Cobalt zeolite Y, 120 g, was mixed with 76 ml water and 35.5 g of the ammonium phosphomolybdate filter cake. The mixture was stirred for 20 minutes and then dried overnight at 220°F. The dried cake was granulated through a 60 mesh screen before mixing with 126 ml Ludox LS and 36 ml 1.7M Co(NO$_3$)$_2$. The resulting paste was formed into pellets, dried and calcined as previously.

The feed used in the tests was a synthetic gas oil 50—50 blend of tetralin and mineral oil by volume boiling between 400° and 812°F., having an API gravity of 24.6° and containing 1.0 weight-percent sulfur. As the mineral oil was a paraffinic stock, only 50 volume percent of the feed molecules contained aromatic nuclei and these molecules, i.e., tetraline, were not completely aromatic. These factors tend to complicate determination of aromatic conversion by product analysis. The test conditions were: 650°F., 1,000 psig, 2.0 LHSV and 6,000 CF H$_2$G.

Table 1

|  | Example 1 | Example 2 | Example 3 | Example 4 |
| --- | --- | --- | --- | --- |
| Composition |  |  |  |  |
| %MoO$_3$ | 14.7[a] | 12.7[b] | 12.8[b] | 12.7[c] |
| %CoO | 5.8 | 5.3 | 5.9 | 5.9 |
| %SiO$_2$ | 27 | 27 | 27 | 27 |
| Activity Data |  |  |  |  |
| Hours on Stream | 3–19 | 2–18 | 3–19 | 3–19 |
| °API | 32.4 | 35.8 | 37.5 | 35.9 |
| 400°F. Conversion, vol-% of Feed | 40 | 53 | 52 | 51 |
| Gasoline Composition: |  |  |  |  |
| Aromatics, vol-% | 42 | 36 | 34 | 36 |
| Olefins, vol-% | 0 | 0 | 0 | 0 |
| Saturates, vol-% | 58 | 64 | 66 | 64 |

[a] Impregnation with ammonium molybdate solution.
[b] Mulled with insoluble molybdic oxide.
[c] Mulled with insoluble ammonium phosphomolybdate.

Examples 5–8 and Table 2 further demonstrate the adverse effect of molybdenum solvation on hydrocracking activity. The catalyst of Example 5, made by impregnating nickel zeolite Y with a solution of ammonium heptamolybdate, was inferior to that of Example 6, made by acidifying a molybdate solution and mixing with the zeolite. Example 8 shows the adverse effect of decomposing and dissolving ammonium phosphomolybdate in the presence of nickel zeolite Y. Higher hydrocracking conversions and improved denitrogenation occurred when the molybdenum solubility was decreased through the use of ammonium phosphomolybdate (Example 7) or the formation of molybdic acid (Example 6).

The catalysts of Examples 5–8 were all made from one batch of nickel zeolite Y. The preliminary nickel exchange consisted of mixing 550 g ammonium zeolite y (1.6% Na$_2$O) with one liter of 1.0 M nickel chloride, heating to 200°F., allowing to cool, filtering and washing free of chloride. This exchange was repeated twice. After the final wash the product was dried overnight at 200 °F. The loss on ignition was 17.6 percent and the nickel content was 8.5% NiO on a calcined basis. One hundred gram portions of this material were used to prepare the four catalysts of the examples. The following quantities of components were added to each of the catalysts:

Ammonium heptamolybdate, 26.0 g, containing 82% MoO$_3$.
Ludox LS silica sol, 112 m, containing 0.36 g SiO$_2$/ml.
Nickel oxide, 4.1 g, was added as 1.7 M nickel nitrate (0.127 g NiO/ml) or as 1.7 M nickel nitrate and nickel carbonate powder. When nickel carbonate was added the nickel nitrate was decreased to keep the same total number of equivalents.

A small quantity of phosphorus, approximately 0.8 g P$_2$O$_5$, was added as part of the phosphomolybdate complex to catalysts prepared by the method of Examples 7 and 8.

EXAMPLE 5

The nickel zeolite Y powder was mixed with the Ludox LS and 32 ml 1.7M nickel nitrate. The paste was cast into pellets, dried, and calcined at 600°F. for 1 hour. The calcined pellets were immersed overnight in a solution of the ammonium heptamolybdate in 150 ml water, drained, dried and recalcined at 600°F. A small amount of nickel molybdate precipitated during the impregnation due to nickel-ammonium exchange. After the second calcination the pellets were spread in a thin layer and allowed to absorb the remainder of the impregnation solution. Next, the catalyst was activated by calcining overnight at 900°F. in dry flowing air and then saturated with hydrogen sulfide at room temperature.

EXAMPLE 6

The ammonium heptamolybdate was dissolved in 100 ml water. Sufficient 3N nitric acid was added to lower the pH to 4.0 and precipitate the molybdate prior to contact with the aluminosilicate. The nickel zeolite Y powder was slurried with this solution, allowed to stand overnight, and then dried on a steam bath. The dried powder was mixed with the Ludox LS and 32 ml 1.7M nickel nitrate. The paste was formed into pellets and activated according to the procedure of Example 5.

EXAMPLE 7

The ammonium heptamolybdate was dissolved in 130 ml water. Then 25 ml concentrated nitric acid was added. A phosphate solution was prepared by dissolving 6.5 g diammonium phosphate in 25 ml water and 13 ml concentrated nitric acid. The phosphate solution was slowly added to the molybdate solution and then allowed to stand 20 minutes. The ammonium phosphomolybdate precipitate was collected by centrifuging and washed with 50 ml water. The washed precipitate was reslurried in 80 ml water. Powdered nickel carbonate, 2.9 g, was added as a buffer which would not decompose the phosphomolybdate complex while protecting the zeolite from strong acidity. The nickel zeolite Y powder was added to the slurry. The pH of the combination was 4.9. Next, the slurry was dried on a steam bath and the dried powder was mixed with the Ludox LS and 18 ml 1.7M nickel nitrate. The paste was formed into pellets and activated according to the previous examples.

EXAMPLE 8

The same procedure and quantities used in Example 7 were repeated, except for the pH adjustment. The pH of the slurry was increased from 4.9 to 6.7 by the addition of a small amount of ammonium hydroxide prior to evaporating on the steam bath.

The hydrocracking activity comparisons shown in Table 2 were determined using a gas oil feed with the following characteristics:

| | |
|---|---|
| Gravity | 24.9° API |
| Boiling Range | 455–890°F. |
| Sulfur Content | 1.05 wt-% |
| Nitrogen Content | 0.233 wt-% |

The test conditions were 800°F., 1,400 psig, 2.0 LHSV, and 12,000 CF $H_2$/B.

Table 2

| | Example 5 | Example 6 | Example 7 | Example 8 |
|---|---|---|---|---|
| Composition | | | | |
| %$MoO_3$ | 14.3[b] | 13.1[c] | 11.1[d] | 12.4[e] |
| %NiO | 6.6 | 6.5 | 6.3 | 6.8 |
| %SiO | 27 | 27 | 27 | 27 |
| pH[a] | 5.5 | 3.8–4.0 | 4.9 | 6.7 |
| Form of Added Mo. | Soluble | Insoluble | Insoluble | Insoluble |
| Activity Data | | | | |
| Hours on Stream | 27–36 | 27–36 | 27–36 | 27–36 |
| 455°F. Conversion, vol-% of Feed | 47.5 | 55.7 | 56.6 | 47.8 |
| 120–360° Gasoline, vol-% of Feed | 30.0 | 40.8 | 36.8 | 31.6 |
| Residual Nitrogen, wt-% | 0.027 | 0.013 | 0.020 | 0.037 |

[a] During molybdenum addition.
[b] Added as soluble ammonium heptamolybdate.
[c] Added as insoluble acidified molybdate.
[d] Added as insoluble acidified phosphomolybdate.
[e] Added as soluble phosphomolybdate at high pH.

Examples 9 and 10 and Table 3 compare two parallel nickel-molybdena zeolite Y catalysts. This comparison again shows the favorable effect of acidifying the molybdate solution to form relatively insoluble molybdic acid. The feed and test conditions were the same as those used in Examples 5 to 8.

EXAMPLES 9 & 10

Ammonium heptamolybdate, 20.7 g, was dissolved in 100 ml water and the pH was adjusted to 7.0 with 15N $NH_4OH$. Ammonium zeolite Y powder, 100 g, was then added and the mixture stirred and evaporated to a pasty consistency on a steam bath. 27 ml of 1.7M nickel nitrate was added and the mixture was stirred and dried on a steam bath. The dried material was then granulated and mixed with 113 ml of Ludox LS and 32 ml 1.7M nickel nitrate. This mixture was then cast into 0.094 × 0.020-inch pellets, dried and calcined at 900°F. The same procedure was employed for Example 10 except that the pH was initially adjusted to 4.0 with 15N $HNO_3$.

Table 3

| | Example 9 | Example 10 |
|---|---|---|
| Activity Data | | |
| pH of Preparation | 7.0 | 4.0 |
| Product Gravity, °API | 41.1 | 44.4 |
| 455°F. Conversion, vol-% of Feed | 42.5 | 48.0 |
| 120–360°F. Gasoline, vol-% of Feed | 28.0 | 31.3 |
| Residual Sulfur, wt-% | 0.091 | 0.040 |
| Residual Nitrogen, wt-% | 0.045 | 0.035 |

Although lowering the pH, as illustrated in the above examples, is an effective way of decreasing the solubility of molybdates, tungstates, etc., an even more quantitative removal from solution can be achieved by use of an adsorbing or precipitating agent in the catalyst preparation. Insoluble hydrous oxides of metal such as titanium, zirconium, thorium, iron and chromium have been found to be particularly effective for this purpose. The hydrous oxide, in addition to being insoluble, should have a high isoelectric point and should form a catalytically active combination with the hydrogenation component. Addition of the hydrogenation component should be effected at a pH that is below the isoelectric point of the hydrous oxide. This pH value will generally be in the range of about 3 to 5. Examples 11–14 and Table 4 illustrate preparation and activity for catalysts using titanium or zirconium for adsorption or precipitation of molybdates into zeolite catalysts.

EXAMPLE 11

The titania gel used in this example was prepared by adding 25 ml 4M $TiCl_4$ solution to 250 ml 2.4N ammonium hydroxide. The gel was collected by filtration, washed free of chloride, and then dried for two hours at 400°F. A 6.2 g portion of the dried gel was mulled with 100 g ammonium zeolite Y. The mulled powder mixture was slurried in 215 ml of 0.69M ammonium molybdate. The pH was adjusted to the interval 3.6 – 3.8 with nitric acid. After 2 days the solids were collected by filtration. The dissolved molybdena was recovered by evaporating the filtrate and calcining the residue 2 hours at 700°F. The weight of the residue, 7.4 g, indicated that approximately 65 percent of the original molybdate had been adsorbed on the titania gel-zeolite mixture. Next, the recovered 7.4 g of molybdena was added back to the catalyst by mulling with the zeolite mixture. Nickel was exchanged into this combination by slurrying with 62 ml 1.0M nickel nitrate, allowing to stand overnight, and filtering. The filter cake was dried, mixed with 115 ml Ludox LS 30 percent silica sol and 36 ml 1.7M nickel nitrate, cast into pellets, and calcined at 900°F.

EXAMPLE 12

The titania in this example was formed in situ by adding solutions of titanium chloride and ammonium hydroxide concurrently to the zeolite slurry. This procedure gives an improved molybdena distribution and is easier to handle during washing. Removal of chloride ions by washing improves the subsequent adsorption of molybdic acid. The pH must be lower than the isoelectric point of titania during the adsorption of molybdena. The specific procedure was as follows:

To 100 g of ammonium zeolite Y was added 370 ml of 0.2M $TiCl_4$ and sufficient 3N $NH_4OH$ to maintain the pH in the range 3.5 – 3.9. The slurry was then filtered and the residue washed with water and slurried in 177 ml of 0.69M ammonium molybdate solution. The resulting mixture was aged 2 days at room temperature and filtered. The dissolved molybdena was recovered by evaporating the filtrate and calcining the residue 2 hours at 700°F. The weight of residue, 2.3 g, indicated that approximately 87 percent of the original molybdate had been adsorbed on the titania-zeolite combination. Next, the recovered 2.3 g of molybdena was added back to the catalyst by mulling with the zeolite combination. Nickel was exchanged into the catalyst by slurrying with 59 ml 1.0M nickel nitrate, allowing to stand overnight, and filtering. The filter cake was dried, mixed with 111 ml Ludox LS and 35 ml 1.7M nickel nitrate, cast into pellets, and calcined at 900°F.

EXAMPLE 13

The catalyst of this example was made by concurrently adding titanium and molybdenum solutions to the zeolite slurry. The proportions were adjusted during this addition to keep the pH less than 4.0 since a neutral or high pH would have caused the molybdenum to remain in solution. The specific procedure was as follows:

A 100 g portion of ammonium zeolite Y was slurried in 200 ml water. Ammonium molybdate, 177 ml 0.69M solution, and $TiCl_4$, 370 ml 0.2M solution, were added concurrently to this slurry. Sufficient 3N ammonium hydroxide was also added to maintain the pH in the range 3.5 – 3.9. The resulting combination was aged 2 days at room temperature and filtered. The dissolved molybdena was recovered by evaporating the filtrate and calcining the residue 2 hours at 700°F. The weight of residue, 2.8 g, indicated that approximately 85 percent of the original molybdate had been adsorbed or precipitated on the titania-zeolite combination. Next, the recovered 2.8 g of molybdena was added back to the catalyst by mulling with the zeolite combination. Nickel was exchanged into the catalyst by slurrying with 59 ml 1.0M nickel nitrate, allowing to stand overnight, and filtering. The filter cake was dried, mixed with 111 ml Ludox LS and 35 ml 1.7M nickel nitrate, cast into pellets, and calcined at 900°F.

EXAMPLE 14

The catalyst of this example was made by alternate addition of titanium, molybdenum and zirconium. The final extra addition of zirconyl chloride considerably lowered the molybdate concentration in the filtrate (only 6.7 percent of the molybdenum remained dissolved after the zirconium addition). The specific procedure was as follows:

A 438 g portion of ammonium zeolite Y was slurried in 530 ml water. $TiCl_4$, 980 ml 0.2M solution, was added to the slurry concurrently with sufficient 3N ammonium hydroxide to maintain the pH in the range 3.5 – 3.9. The solids were collected by filtration, washed free of chlorides, and then slurried in 470 ml 0.69M ammonium molybdate. Next, 150 ml 0.2M $TiCl_4$ and 200 ml 1.0M zirconyl chloride were added concurrently with sufficient 3N ammonium hydroxide to maintain 3.5 – 3.9 pH. Then the dissolved molybdena was determined by filtering, evaporating the filtrate, and calcining the residue two hours at 700°F. The weight of the residue, 3.2 g indicated that approximately 93 percent of the original molybdate had been adsorbed or precipitated on the titania-zirconia-zeolite combination. Next, the recovered 3.2 g of molybdena was added back to the catalyst by mulling with the zeolite combination. Nickel was exchanged into the catalyst by slurrying with 160 ml 1.0M nickel nitrate, allowing to stand overnight, and filtering. The filter cake was dried, mixed with 295 ml Ludox LS and 93 ml 1.7M nickel nitrate, cast into pellets, and calcined at 900°F.

The data in Table 4 compare the hydrocracking and hydrogenation activities of the catalysts of Examples 11–14. The feed and test conditions used in testing these catalysts were the same as those used for testing the catalysts of Examples 1 to 4. The catalyst of Example 14, in which the molybdenum formed the least soluble combination with titanium and zirconium, was the most active. The catalyst of Example 13, made by concurrent additions, and that of Example 12, made by adsorption on the in-situ titania, showed intermediate amounts of dissolved molybdena. These two catalysts also had intermediate activities. The catalyst prepared with the separately prepared titania gel, that of Example 11, had the largest amount of dissolved molybdenum and the lowest activity. These results are consistent with the data in Tables 1, 2, and 3, i.e., combining or forming insoluble molybdena with the zeolite gives greater activity. The catalyst of Example 1, prepared by impregnating with completely dissolved ammonium molybdate, was the least active catalyst tested. Mulling with insoluble forms of molybdenum gave appreciable improvement, as shown by the catalysts of Examples 2, 3 and 4. Forming insoluble molybdates in the presence of the zeolite gave the highest activities, as shown by the catalysts of Examples 12, 13 and 14.

Table 4

|  | Example 11 | Example 12 | Example 13 | Example 14 |
|---|---|---|---|---|
| Composition |  |  |  |  |
| %MoO$_3$ | 12.7 | 11.0 | 10.4 | 9.3 |
| %NiO | 6.5 | 5.8 | 5.9 | 4.0 |
| %TiO$_2$ | 4.5 | 3.3 | 3.5 | 4.0 |
| %ZrO$_2$ |  |  |  | 5.6 |
| pH | 3.6–3.8 | 3.5–3.9 | 3.5–3.9 | 3.5–3.9 |
| Activity Data |  |  |  |  |
| Hours on Stream | 3–19 | 2–18 | 2–18 | 2–18 |
| °API | 34.7 | 38.5 | 40.3 | 41.8 |
| 400°F. Conv., vol-% of Feed | 51 | 59 | 62 | 73 |
| Gasoline Comp. |  |  |  |  |
| Aromatics, vol-% | 42 | 31 | 28 | 25 |
| Olefins, vol-% | 0 | 0 | 0 | 0 |
| Saturates, vol-% | 58 | 69 | 72 | 75 |

As described above, soluble components can be used to prepare highly active zeolite catalysts provided there is insufficient water to dissolve the Group VIB component. The catalysts of the following Examples 15 and 16, were made by mulling cobalt zeolite Y powder with crystals of nickel nitrate and ammonium heptamolybdate. Then, after the mixture was uniform, a 30 percent alumina sol was added in an amount to provide 20% Al$_2$O$_3$ binder on a dry basis. The pH of the extrusion pastes were 4.4 and 3.9 for Examples 15 and 16, respectively. This acidity, by forming molybdic acid, suppressed the tendency of molybdenum to dissolve. The catalyst of Example 16, made with 900°F. calcined cobalt zeolite Y, had the highest hydrocracking activity and produced fewer light hydrocarbons per amount of gasoline. Results are shown in Table 5. The feed and test conditions were the same as those used in testing the catalysts of Examples 1 to 4.

EXAMPLE 15

A 73 g portion of cobalt zeolite Y, which contained 16.3 percent adsorbed water, was mulled with 19.5 g Ni(NO$_3$).6H$_2$O and 18.3 g (NH$_4$)$_6$ Mo$_7$O$_{24}$.4H$_2$O crystals in a pan muller for 30 minutes. Then 67 g of an acidic 30 percent alumina sol was added to provide 20% Al$_2$O$_3$ binder on a dry basis. Nitric acid in the alumina sol lowered the pH of the final mixture to 4.4. The paste mixture was extruded as 1/16-inch rods, dried, and activated by calcining at 900°F.

EXAMPLE 16

A portion of the cobalt zeolite Y used in Example 15 was calcined 16 hours at 900°F. Then 61 g of the calcined zeolite was mulled with 19.5 g Ni(NO$_3$)$_2$.6H$_2$O and 18.3 g (NH$_4$)$_6$ Mo$_7$O$_{24}$.4H$_2$O crystals in a pan muller for 30 minutes. Next, 67 g of an acidic 30 percent alumina sol was added to provide 20% Al$_2$O$_3$ binder on a dry basis. Nitric acid in the alumina sol lowered the pH of the final mixture to 3.9. The paste mixture was extruded as 1/16-inch rods, dried, and activated by calcining at 900°F.

Table 5

|  | Example 15 | Example 16 |
|---|---|---|
| Activity Data |  |  |
| Hours on Stream | 2–18 | 2–18 |
| °API | 36.5 | 42.1 |
| 400° Conversion, vol-% of Feed | 52 | 65 |
| Gasoline Composition |  |  |
| Aromatics, vol-% | 35 | 25 |
| Olefins, vol-% | 0 | 0 |
| Saturates, vol-% | 65 | 75 |

I claim:

1. A process for hydrocracking a hydrocarbon feedstock which comprises contacting said feedstock plus added hydrogen, and under hydrocracking conditions with a catalyst comprising a crystalline aluminosilicate zeolite cracking base intimately composited with a finely divided Group VIB metal hydrogenating component, said hydrogenating component or a precursor thereof having been composited with said zeolite base in a substantially undissolved form by intimately admixing the two components in an aqueous medium having a pH below 6, but sufficiently high to avoid acid destruction of the zeolite crystal structure.

2. A process as defined in claim 1 wherein the pH of said aqueous medium is between about 3 and 5.

3. A process as defined in claim 1 wherein said zeolite base is a nickel- or cobalt-stabilized Y zeolite.

4. A process as defined in claim 1 wherein said zeolite is a steam-stabilized hydrogen Y zeolite.

5. A process as defined in claim 1 wherein said hydrogenating component is admixed with said zeolite base in the form of molybdenum oxide and/or tungsten oxide.

6. A process as defined in claim 1 wherein said hydrogenating component is admixed with said zeolite base in the form of ammonium heptamolybdate and/or ammonium phosphomolybdate.

7. A process as defined in claim 1 wherein said hydrogenating component is admixed with said zeolite base in the form of an insoluble complex of molybdate or tungstate ions with at least one hydrous oxide of a metal selected from the class consisting of zirconium, titanium, chromium, thorium and iron.

8. A process as defined in claim 1 wherein said hydrogenating component is admixed with said zeolite base in the form of ammonium heptamolybdate, and wherein a hydrous oxide of zirconium, titanium, chromium, thorium or iron is separately added to the mixture.

9. A process as defined in claim 1 wherein:
   1. a cobalt and/or nickel hydrogenating component and an alumina gel binder are composited with the zeolite base and the Group VIB metal hydrogenating component in said aqueous medium;
   2. the pH of said aqueous medium is between about 3 and 5;
   3. the zeolite base is a steam-stabilized hydrogen Y zeolite, a nickel-stabilized Y zeolite, or a cobalt-stabilized Y zeolite; and
   4. said Group VIB metal hydrogenating component is a molybdenum sulfide.

10. A process for hydrocracking a hydrocarbon feedstock which comprises contacting said feedstock plus added hydrogen, and under hydrocracking conditions with a catalyst comprising a crystalline aluminosilicate zeolite cracking base intimately composited with at least about 5 weight-percent of a finely divided Group VIB metal hydrogenating component, said hydrogenating component or a precursor thereof having been composited with said zeolite base by comulling the two components as solids with only sufficient water to yield a moist, extrudable or pelletizable mixture, the aqueous phase of said mixture having a pH below 6, but sufficiently high to avoid acid destruction of the zeolite crystal structure, and thereafter shaping, drying and calcining the mixture.

11. A process as defined in claim 10 wherein said aqueous phase has a pH between about 3 and 5.

12. A process as defined in claim 10 wherein said zeolite base is a nickel- or cobalt-stabilized Y zeolite.

13. A process as defined in claim 10 wherein said zeolite is a steam-stabilized hydrogen Y zeolite.

14. A process as defined in claim 10 wherein said hydrogenating component is admixed with said zeolite base in the form of molybdenum oxide and/or tungsten oxide.

15. A process as defined in claim 10 wherein said hydrogenating component is admixed with said zeolite base in the form of ammonium heptamolybdate and/or ammonium phosphomolybdate.

16. A process as defined in claim 10 wherein said hydrogenating component is admixed with said zeolite base in the form of an insoluble complex of molybdate or tungstate ions with at least one hydrous oxide of a metal selected from the class consisting of zirconium, titanium, chromium, thorium, and iron.

17. A process as defined in claim 10 wherein said hydrogenating component is admixed with said zeolite base in the form of ammonium heptamolybdate, and wherein a hydrous oxide of zirconium, titanium, chromium, thorium or iron is separately added to the mixture.

18. A process as defined in claim 10 wherein
   1. a cobalt and/or nickel hydrogenating component and an alumina gel binder are composited with the zeolite base and the Group VIB metal hydrogenating component in said aqueous phase;
   2. the pH of said aqueous phase is between about 3 and 5;
   3. the zeolite base is a steam-stabilized hydrogen Y zeolite, a nickel-stabilized Y zeolite, or a cobalt-stabilized Y zeolite; and
   4. said Group VIB metal hydrogenating component is a molybdenum sulfide.

* * * * *